United States Patent
Spatafora

(10) Patent No.: US 7,059,478 B2
(45) Date of Patent: Jun. 13, 2006

(54) METHOD AND A DEVICE FOR THE REJECTION OF COMMODITIES

(75) Inventor: Mario Spatafora, Bologna (IT)

(73) Assignee: G.D S.p.A., Bologna (IT)

( * ) Notice: Subject to any disclaimer, the term of this patent is extended or adjusted under 35 U.S.C. 154(b) by 437 days.

(21) Appl. No.: 10/415,735

(22) PCT Filed: Nov. 12, 2001

(86) PCT No.: PCT/IB01/02129

§ 371 (c)(1),
(2), (4) Date: May 2, 2003

(87) PCT Pub. No.: WO02/40362

PCT Pub. Date: May 23, 2002

(65) Prior Publication Data

US 2004/0094168 A1    May 20, 2004

(30) Foreign Application Priority Data

Nov. 14, 2000   (IT)   ............................ BO2000A0657

(51) Int. Cl.
*A24C 5/00* (2006.01)
*B07C 5/00* (2006.01)
(52) U.S. Cl. .................. 209/535; 209/936; 131/282
(58) Field of Classification Search ............... 209/535, 209/536, 537, 555, 912, 923, 936; 131/282; 53/54; 198/418.6, 431, 432, 532, 803.14
See application file for complete search history.

(56) References Cited

U.S. PATENT DOCUMENTS

| | | | | | |
|---|---|---|---|---|---|
| 1,846,808 | A | * | 2/1932 | Hohn et al. | 209/536 |
| 3,473,037 | A | * | 10/1969 | Schmermund | 250/223 R |
| 3,603,445 | A | * | 9/1971 | Zausch et al. | 198/418.3 |
| 3,735,767 | A | * | 5/1973 | Kruse et al. | 131/283 |
| 4,266,674 | A | * | 5/1981 | Bell et al. | 209/536 |
| 4,444,520 | A | * | 4/1984 | Hanakata et al. | 400/88 |
| 4,445,520 | A | * | 5/1984 | Knight et al. | 131/282 |
| 4,644,150 | A | * | 2/1987 | Kuga et al. | 209/536 |
| 5,366,096 | A | * | 11/1994 | Miller | 209/535 |
| 6,115,991 | A | * | 9/2000 | Spatafora | 53/151 |
| 6,484,867 | B1 | * | 11/2002 | Spatafora et al. | 198/418.1 |

FOREIGN PATENT DOCUMENTS

EP    0843974    5/1998

* cited by examiner

*Primary Examiner*—Joseph C Rodriguez
(74) *Attorney, Agent, or Firm*—Timothy J. Klima

(57) ABSTRACT

A cigarette packer (1) incorporates a station at which cigarettes (2) are formed into groups (12) and from which the groups (12) are advanced by a first conveyor (13) along a first feed path (P) toward a wrapping station (16). A first inspection device (24) located along the first feed path (P) detects initially whether or not there are any defective cigarettes (2) in each group (12), and a second inspection device (45) located along a second conveyor (30) then identifies the single defective cigarettes (2) detected by the first device (24); the second inspection device (45) operates in conjunction with a rejection unit (46) by which defective cigarettes (2) are removed from the second conveyor (30).

20 Claims, 4 Drawing Sheets

METHOD AND A DEVICE FOR THE REJECTION OF COMMODITIES

This application is the National Phase of International Application PCT/IB01/02129 filed Nov. 12, 2001 which designated the U.S. and that International Application was published under PCT Article 21(2) in English.

1. Technical Field

The present invention relates to a method for the rejection of commodities.

2. Background

In particular, the invention relates to machines for packing cigarettes, albeit with no limitation implied, and is applicable to advantage in bringing about the rejection of defective cigarettes from relative groups of cigarettes.

Conventionally, in cigarette packers, cigarettes are fed randomly en masse into a hopper affording a plurality of substantially vertical walls separated one from another by a distance substantially equal to the diameter of one cigarette. The walls create a plurality of channels by which the cigarettes are separated into substantially vertical stacks and advanced, their axes disposed transversely to the direction of movement, toward respective outlets of the hopper where they are ordered into groups made up of a predetermined number.

The groups of cigarettes are transferred from the hopper to a conveyor equipped with a plurality of pockets advancing in succession and positionable momentarily alongside the aforementioned outlets in such a way that each can receive a respective group of cigarettes.

Once loaded into the pockets of the conveyor, the groups of cigarettes are fed to a wrapping line along which they undergo a plurality of operations ending ultimately with the emergence of respective finished packets of cigarettes.

Cigarette packers of conventional type utilize mainly two types of in-process inspection.

A first type of inspection is effected directly on the single cigarettes by a plurality of sensors positioned along each of the channels afforded by the hopper. This method of inspection presents the drawback that it requires a significant number of sensors, equal at least to the number of cigarettes making up one layer of a group, multiplied by the number of hopper outlets, and is also of limited reliability inasmuch as inspection occurs before the cigarettes are transferred into the respective pockets of the conveyor and before the conveyor is accelerated thereafter away from its stationary position alongside the hopper. More exactly, the steps of transferring the groups into the pockets and then accelerating the conveyor have the effect of jerking and shaking the cigarettes, which tend as a result to shed particles of the tobacco filler from their respective ends.

A second type of inspection is carried out on the cigarettes of each row, along the path followed by the pocket conveyor, to verify that the ends of the single cigarettes continue to retain the tobacco filler correctly following the step of transferring the groups into the pockets.

In either case, should the inspection system detect one or more defective cigarettes, it is the conventional practice to reject the entire group of which any such defective cigarette happens to form a part, with the result that a significant number of good cigarettes will be lost.

BRIEF SUMMARY OF THE INVENTION

The object of the present invention is to provide a method for the rejection of commodities that will be unaffected by the aforementioned drawbacks.

The stated object is realized according to the present invention in a method for the rejection of commodities supplied en masse to the inlet of a hopper affording at least one outlet and comprising at least one station, coinciding with the outlet, at which the commodities are formed into groups and from where each group of commodities is directed into a respective pocket of first conveying means set in motion along a first predetermined feed path at least toward a first station where the groups of commodities are wrapped, characterized in that it comprises the steps of effecting a first inspection of the commodities of each formed group occupying the respective pocket, emptying a pocket of a group of commodities in which at least one commodity is found during the first inspection to be defective, gathering the commodities of the group removed thus from the pocket and directing them along a second predetermined path, effecting a second inspection of the single commodities to identify which is or are defective, rejecting the defective commodity or commodities, and recovering the commodities of the group not identified as being defective.

The present invention also relates to a device for the rejection of commodities.

The stated object is thus realized similarly in a device for the rejection of commodities supplied en masse to the inlet of a hopper affording at least one outlet and comprising at least one station coinciding with the outlet at which the commodities are formed into groups and from where each group of commodities is directed into a respective pocket of first conveying means set in motion by respective first drive means along a first predetermined feed path at least toward a first station where the groups of commodities are wrapped, characterized in that it comprises first means by which to inspect the commodities of each formed group occupying the respective pocket, means by which to empty a pocket of a group of commodities in which at least one commodity is identified by the first inspection means as being defective, means by which to gather the commodities of the group removed thus from the pocket and direct them along a second predetermined path, second means by which to inspect the single commodities and identify which is or are defective, means by which to reject the defective commodity or commodities.

BRIEF DESCRIPTION OF THE SEVERAL VIEWS OF THE DRAWINGS

The invention will now be described in detail, by way of example, with the aid of the accompanying drawings, in which.

DETAILED DESCRIPTION OF THE INVENTION

Figure 1:
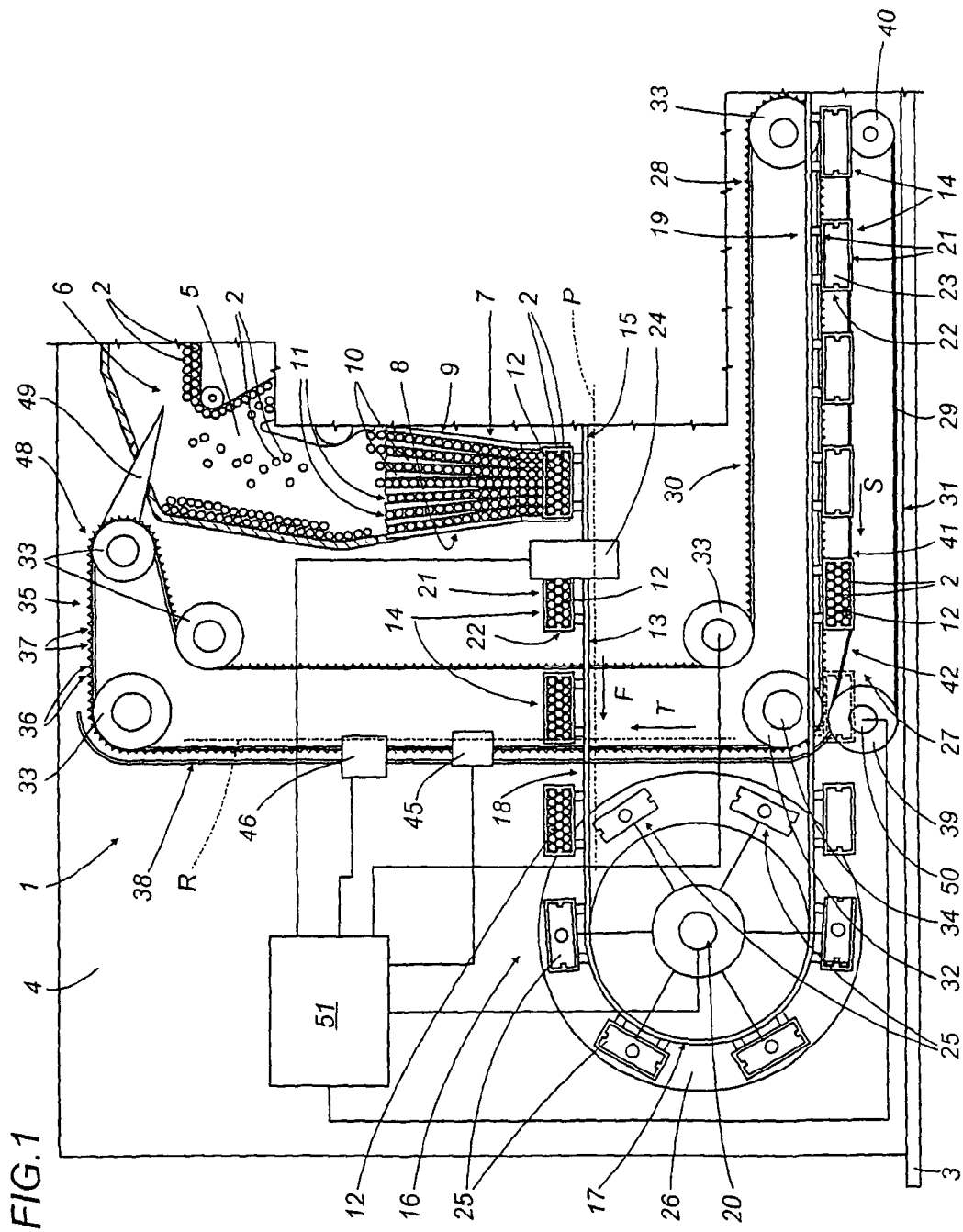
FIGS. 1 and 4 illustrate a portion of a packing machine embodied in accordance with the present invention, viewed schematically in a side elevation with certain parts in section and others omitted for clarity, and shown in two different steps of operation.

With reference to FIG. 1 of the accompanying drawings, 1 denotes a portion, in its entirety, of a machine for packing cigarettes 2, comprising a frame 3 and a vertical rear bulkhead 4 extending upward from the frame 3.

Cigarettes 2 are fed en masse from above into a hopper 5, in a conventional manner not illustrated, entering by way of an inlet 6 and bunching together horizontally, side by side. The cigarettes 2 drop thereupon by gravity toward a plurality of bottom outlets of which one only, denoted 7, is indicated in FIG. 1.

Each outlet 7 is compassed by two side walls 8 and 9 and affords a plurality of partition walls 10 combining with one another and with the two side walls 8 and 9 to create a plurality of channels 11 through which the cigarettes 2 are directed. The cigarettes 2 drop down the channels 11 by gravity in respective columns toward a device of familiar embodiment, not illustrated, by which they are formed into ordered groups 12.

Likewise in a conventional manner not illustrated in the drawings, the device by which the cigarettes are formed into groups 12 operates in conjunction with a first conveyor 13 affording pockets 14 by which the ordered groups 12 of cigarettes 2 are accommodated.

The pockets 14 of the first conveyor 13 are carried by a belt 15, spaced apart in substantially uniform manner and caused thus to advance along a first predetermined path 2, in the direction of the arrow denoted F, toward a first wrapping station 16 (indicated schematically) at which the groups 12 of cigarettes 2 undergo a first wrapping operation.

The belt 15 of the first conveyor 13 is looped around two pulleys, one driving and one driven, disposed with axes horizontal and rotatable about respective shafts carried by the aforementioned bulkhead 4. One only of these pulleys, denoted 17, is shown in the accompanying drawings. The pulleys and the belt 15 combine to establish an active top branch 18 of the loop extending along the first path P, beside the outlets 7 of the hopper 5 and the device (not shown) by which the cigarettes 2 are formed into groups 12, and a bottom branch 19 by which the pockets 14 are returned from the first wrapping station 16 to the formation device. The pulley 17 illustrated, the driving pulley, is set in rotation intermittently by respective drive means 20 indicated schematically in the drawings.

Each pocket 14 is of substantially parallelepiped box-like appearance, compassed laterally by four substantially flat walls and more exactly by two larger walls 21 extending parallel to the active branch 18 of the belt 15, and two smaller or flank walls 22 disposed at right angles to the larger walls 21.

The larger walls 21 and flank walls 22 combine to create a compartment 23 internally of the pocket 14 that is proportioned to admit and retain a group 12 of cigarettes 2 consisting in three layers.

Figure 4:
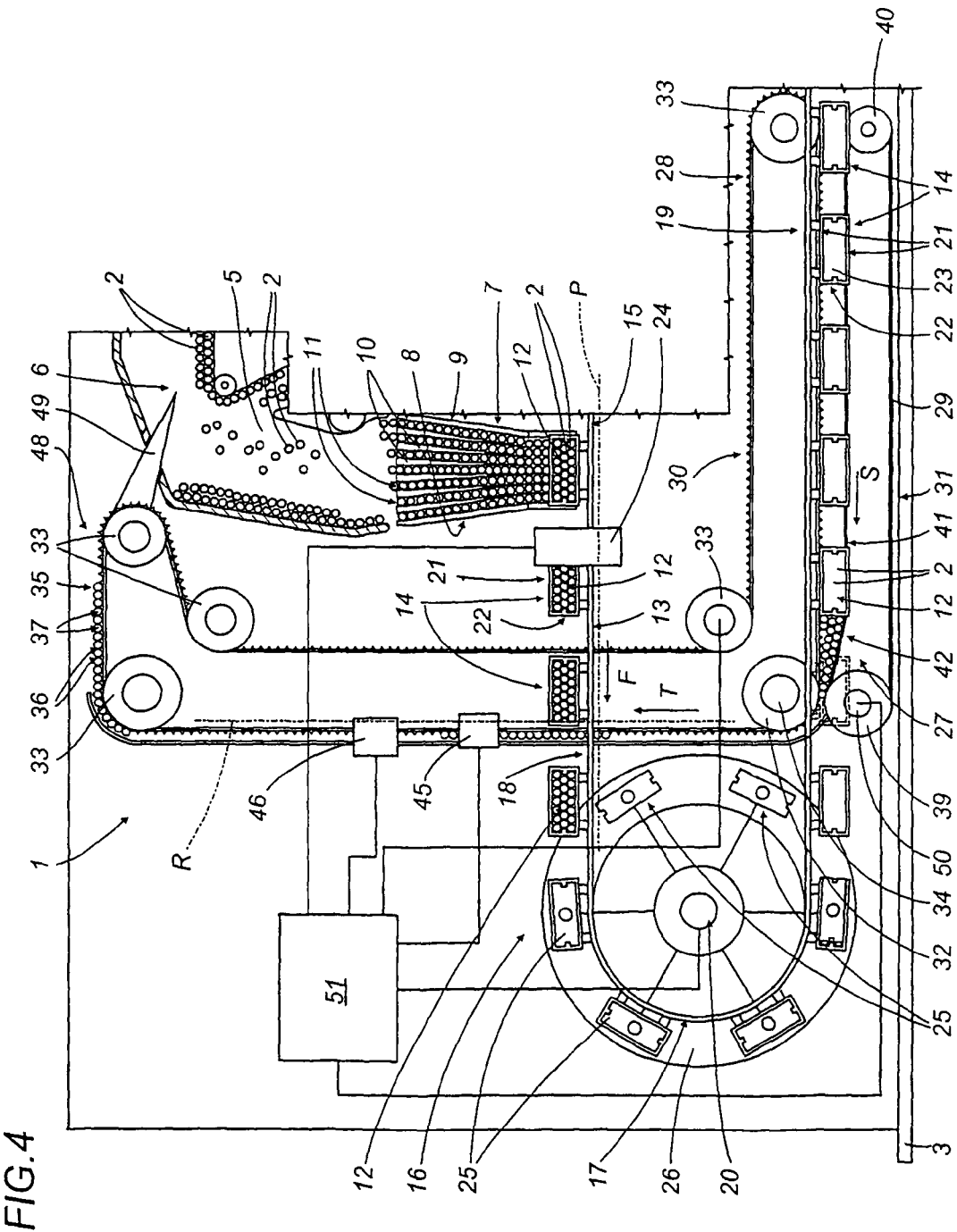

In the particular example of FIGS. 1 and 4, each group 12 is composed of twenty cigarettes 2 arranged in three layers: two outer layers each of seven cigarettes 2 and one intermediate layer of six cigarettes 2.

Located at a given point along the aforementioned first predetermined path P, alongside the active top branch 18 of the first conveyor 13, is a first inspection device 24 comprising respective sensors of conventional type (not illustrated), serving to detect the presence of defective cigarettes 2 in the groups 12 conveyed by the pockets 14 along the first path P.

The first wrapping station 16 affords a plurality of conventional transfer elements 25 equispaced angularly about a wheel 26 coaxial with the driving pulley 17 of the first conveyor 13 and rotatable synchronously with the selfsame pulley 17.

The function of each transfer element 25 is one of directing the groups 12 of cigarettes 2 from the pockets 14 of the first conveyor 13 into respective recesses afforded by a second wrapping station not illustrated in the accompanying drawings.

More precisely, the groups 12 of cigarettes 2 directed by the transfer elements 25 to the second wrapping station will only be those in which no defective cigarettes 2 have been detected by the first inspection device 24.

Located at a given point along the bottom return branch 19 of the first conveyor 13 is an emptying station 27 at which any group 12 of cigarettes 2 not diverted previously by the transfer elements 25 will be removed from the relative pocket 14.

Following its removal from the pocket 14 at the emptying station 27, in a manner to be described in due course, the group 12 of cigarettes 2 is placed between two belts 28 and 29 of a second conveyor 30 and a third conveyor 31, respectively.

The belt 28 of the second conveyor 30 is looped around a plurality of pulleys 32 and 33 disposed with axes horizontal and rotatable about respective shafts carried by the vertical bulkhead 4, of which at least one, for example the pulley denoted 32, is a driving member.

The belt 28 is set in motion by respective second drive means 34 connected to the driving pulley 32, in the direction of the arrow denoted T, taking the cigarettes 2 along a second predetermined path R commencing in the neighbourhood of the emptying station 27 and terminating near the inlet 6 of the hopper 5.

The belt 28 of the second conveyor 30 presents an active face 35 embodied with a plurality of ribs 36 disposed mutually parallel and fashioned in such a way as to define corresponding flutes 37 in which the cigarettes 2 are accommodated while advancing along the second path R.

The second conveyor 30 comprises a restraint 38 masking the belt 28 along a given stretch of the second path R and; operating in combination with the selfsame belt to advance the cigarettes 2 along the second path R.

The belt 29 of the third conveyor 31 is looped around two pulleys 39 and 40 disposed with axes horizontal and rotatable about respective shafts carried by the vertical bulkhead 4, of which the one pulley 39 is a driving member and the other pulley 40 a driven member.

The belt 29 is driven in the direction of the arrow denoted S by respective third drive means 50 connected to the driving pulley 39.

The third conveyor 31 presents an active top branch 41 along which the respective belt 29 is directed toward the face 35 of the belt 28 of the second conveyor 30 incorporating the ribs 36, and caused by transmission elements (not illustrated) to run convergently with the second conveyor 30, thus creating means denoted 42, in their entirety, by which to gather the cigarettes 2 of a group 12 removed from a relative pocket 14 at the emptying station 27.

Figure 2:
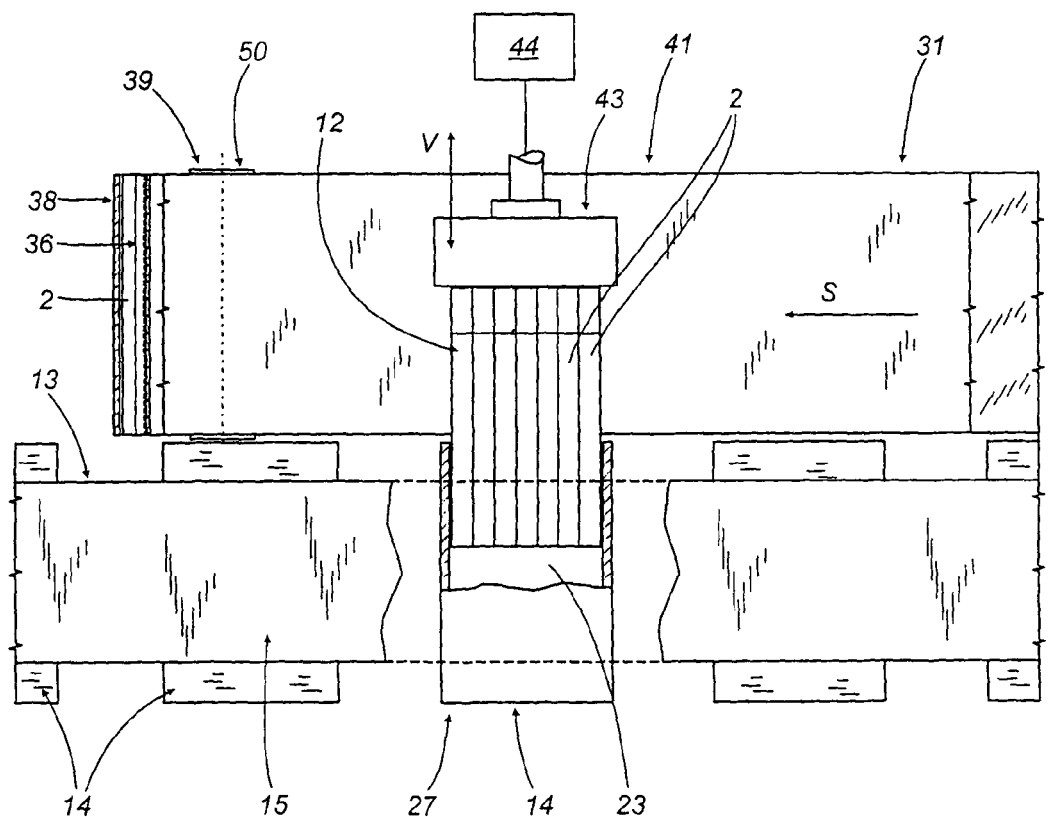
FIGS. 2 and 3 illustrate a detail of the machine in FIG. 1, viewed schematically from above and shown in two successive steps of operation.
Figure 3:
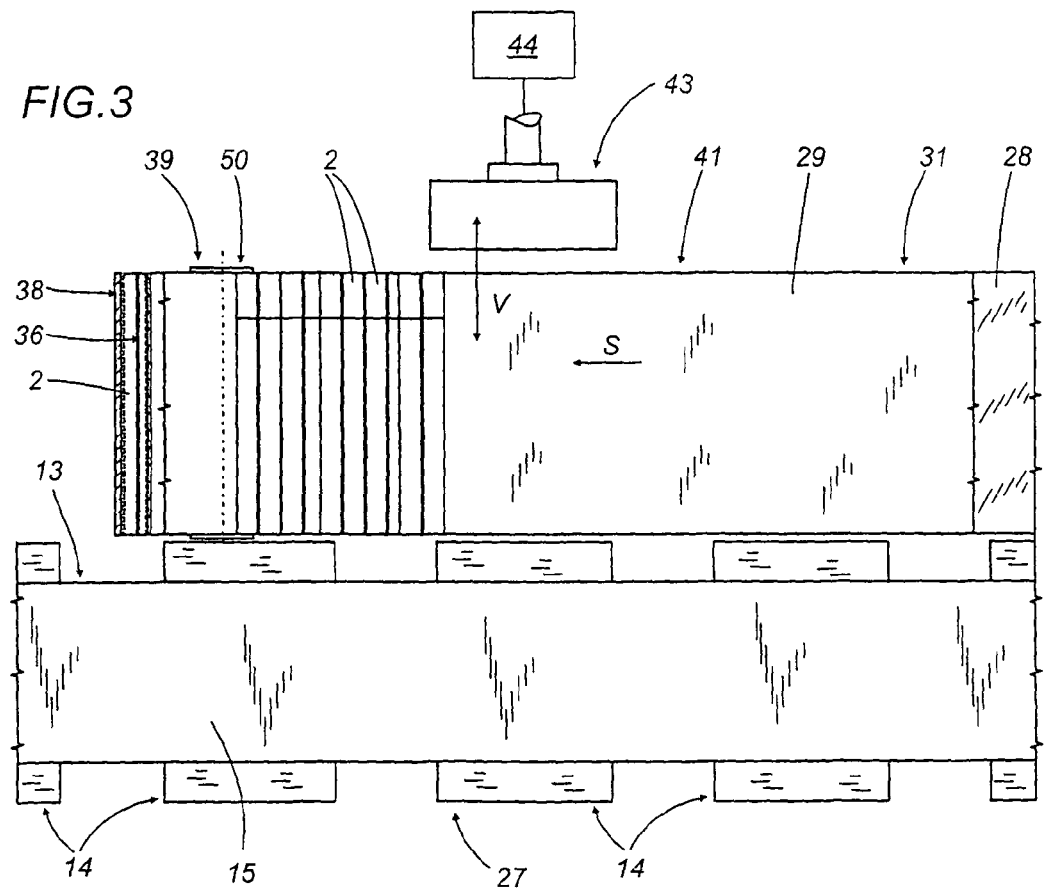

With reference to FIGS. 2 and 3, the emptying station 27 comprises an element 43 by which the group 12 of cigarettes 2 is gripped and held. The element 43 is capable of movement transversely to the second path R, in a direction denoted V, to the end of removing the group 12 from the respective pocket 14 and releasing it onto the belt 29 of the third conveyor 31.

The gripping element 43 is actuated by respective drive means of familiar embodiment (not illustrated in the drawings) and retains the cigarettes 2 of the group 12 by means of suction generated through the agency of aspirating means shown schematically in the drawings as a block denoted 44.

The gripping element 43 is positioned at the emptying station 27 in such a way, advantageously, that its aspirating action is applied to the filter tipped ends of the cigarettes 2.

Referring again to FIGS. 1 and 4, the machine also comprises a second inspection device 45 and a unit 46 by which cigarettes 2 are rejected, placed in sequence along the second path R followed by the belt 28 of the second conveyor 30.

In particular, the second inspection device 45 is equipped, like the first inspection device 24, with sensors of familiar embodiment (not illustrated) such as will detect any substandard cigarette or cigarettes 2 among those ordered in single file on the active face 35 presented by the belt 28 of the second conveyor 30 and advancing along the second predetermined path R.

Figure 5:
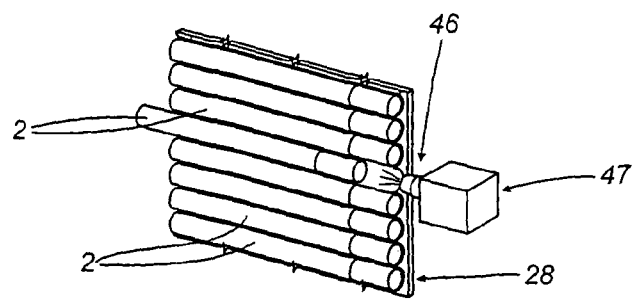
FIG. 5 illustrates a detail of the machine in FIG. 1, viewed in perspective and with certain parts omitted.

As illustrated in FIG. 5, the rejection unit 46 comprises a blower nozzle 47 connected to a source of pressurized air (not illustrated, being familiar in embodiment) and able thus to eject a cigarette 2 found previously to be defective by the sensors of the second inspection device 45.

As discernible from FIGS. 1 and 4, the topmost end 48 of the second conveyor 30, relative to the frame 3, presents a guide element 49 by which the cigarettes 2 running off the belt 28 are taken up and returned to the hopper 5.

Still with reference to FIGS. 1 and 4, the first inspection device 24, the second inspection device 45, the rejection unit 46 and the drive means 20, 34, 50 of the various conveyors 13, 30 and 31 are interlocked by respective lines to a master controller indicated schematically in the drawings by a block denoted 51.

In operation, as illustrated in FIG. 1, each cycle resulting in the formation of a group 12 of cigarettes 2 begins with the cigarettes 2 stacked in an orderly fashion internally of the channels 11 compassed by the partition walls 10 and the side walls 8 and 9 of the hopper 5, and a pocket 14 of the first conveyor 13 in a stationary position alongside the outlet 7 of the hopper 5, ready to interact with the aforementioned formation device (not indicated). A group 12 of twenty cigarettes 2 is transferred by the formation device into the compartment 23 of each pocket 14 afforded by the first conveyor 13.

The pockets 14 are advanced intermittently by the belt 15 along the first predetermined path P in the direction of the arrow denoted F, toward the first wrapping station 16, and caused as a result to pass in front of the first inspection device 24.

As each pocket 14 draws into alignment with the first inspection device 24, the sensors will verify whether or not there are any defective cigarettes 2 in the relative group 12.

Depending on the outcome of the check run on the groups 12 of cigarettes 2 by the first inspection device 24 and the nature of the signals relayed to the controller 51, any groups 12 containing at least one defective cigarette 2 will be labelled substandard whilst those containing no defective cigarettes 2 are considered as responding to the required standard.

When the groups 12 of cigarettes 2 advanced by the first conveyor 13 arrive at the first wrapping station 16, those passed by the first inspection device 24 as being free of defects are diverted by the transfer elements 25 from the relative pockets toward the aforementioned second wrapping station (not illustrated), whereas the groups 12 found to be defective remain in the relative pockets 14 and are advanced further, ultimately gaining the bottom branch 19 of the conveyor 13.

Passing along the bottom branch 19, the pocket 14 containing the defective group 12 of cigarettes 2 is brought to a halt by the belt 15 of the first conveyor 13 alongside the emptying station 27.

As illustrated in FIGS. 2 and 3, the gripping element 43 interacts with the pocket 14 during the pause at the emptying station 27 and removes the cigarettes 2 of the substandard group 12, drawing them out by the filter tip ends. The cigarettes 2 removed thus from the pocket 14 are placed by the gripping element 43 on the belt 29 of the third conveyor 31, and thereupon advanced by the belt 29 in the direction of the arrow denoted S toward a portion of the top branch 41 converging with the second conveyor 30.

Held now between the two belts 28 and 29 of the second and third conveyors 30 and 31, the group 12 of cigarettes 2 will be broken up by the combined action of the selfsame two belts 28 and 29 and the cigarettes 2 fall into single file, advancing along the active face 35 presented by the belt 28 of the second conveyor 30. The step of breaking up the group 12 and rearranging the cigarettes 2 in single file is brought about, advantageously, by operating the two belts 28 and 29 of the second and third conveyors 30 and 31 at different speeds.

Referring to FIG. 4, the cigarettes 2 occupying the active face 35 of the belt 28 and advancing along the second predetermined path R are retained in the flutes 37 by the respective ribs 36.

Ordered thus in single file, the cigarettes 2 are caused by the belt 28 to advance along the second predetermined path R in the direction of the arrow denoted T, proceeding toward the top end 48 of the second conveyor 30 and, in the process, filing past the second inspection device 45.

The sensors of the second inspection device 45 now detect the one or more defective cigarettes 2 in the file and relay an identifying signal to the controller 51.

As the cigarettes 2 then file past the rejection unit 46, the controller 51 pilots the operation of the blower nozzle 47 to eliminate the cigarette or cigarettes 2 identified as defective by the second inspection device 45, expelling them substantially with a single sharp blast of air as illustrated in FIG. 5.

With the defective cigarettes 2 thus eliminated, the remainder continue to be conveyed along the second path R, arriving ultimately at the inlet 6 of the hopper 5 whereupon they are unloaded by the belt 28 onto the guide element 49 and channelled correctly back into the hopper 5.

In this way, the cigarettes 2 not identified by the second inspection device 45 as being defective are returned to the packing cycle and merged again with the mass of cigarettes 2 directed from above into the hopper 5.

To advantage, in an alternative embodiment of the packer machine 1 not illustrated in the drawings, the cigarettes 2 advancing along the second path R might be retained in the flutes 37 presented by the active face 35 of the belt 28 through the agency of conventional aspirating means.

Importantly, the manner in which the cigarettes 2 of a substandard group 12 are separated and ordered serially to enable their passage in single file past the second inspection device 45, as described above, is just one of many alternative solutions that might be adopted when implementing the method disclosed. That is to say, the pair of belts 28 and 29 illustrated by way of example could be replaced by any alternative device capable of bringing about the necessary separation, without prejudice to the spirit of the present invention.

Similarly, in an alternative embodiment of the first conveyor 13, not illustrated in the drawings, the pockets 14 might advance continuously along at least one section of the loop. In particular, the pockets 14 could proceed without pausing through the stage in which they are engaged by the transfer elements 25, and more precisely along a section lying downstream of the hopper 5 and upstream of the emptying station 27, considered in relation to the conveying direction.

Lastly, in a further alternative solution, the continuous section in question might also extend beyond the emptying station 27, considered relative to the conveying direction. In this instance the gripping element 43 will operate as the pockets 14 advance along the first conveyor 13, supported by an auxiliary conveyor of which the movement is synchronized with that of the first conveyer along a given section of the path in such a way that the gripping element 43 and the pocket 14 can advance mutually opposed in fixed relative positions.

The invention claimed is:

1. A method for the rejection of commodities supplied en masse to the inlet of a hopper affording at least one outlet and comprising at least one station, coinciding with the outlet, at which the commodities are formed into groups and from where each group of commodities is directed into a respective pocket of first conveying means set in motion along a first predetermined feed path at least toward a first station where the groups of commodities are wrapped, the method comprising:
effecting a first inspection of the commodities of each formed group occupying the respective pocket;
emptying a pocket of a group of commodities in which at least one commodity is found during the first inspection to be defective;
gathering the commodities of the group removed thus from the pocket and directing them along a second predetermined path;
effecting a second inspection of the single commodities to identify which is or are defective, rejecting the defective commodity or commodities; and
recovering the commodities of the group not identified as being defective.

2. The method as in claim 1, the step of recovering the commodities of the group not identified as being defective comprises the step of merging the selfsame commodities not identified as being defective with the commodities supplied en masse to the inlet of the hopper.

3. The method as in claim 2, wherein the first inspection of the commodities of each formed group occupying a respective pocket occurs during a step of advancing the pocket along the first predetermined path.

4. A method as in claim 2, comprising the subsidiary step of allowing groups containing defective commodities to pass through and beyond the first wrapping station without emptying the respective pocket.

5. The method as in claim 1, wherein the step of recovering the commodities of the group not identified as being defective comprises the step of conveying the selfsame commodities not identified as being defective directly into the hopper.

6. The method as in claim 5, wherein the first inspection of the commodities of each formed group occupying a respective pocket occurs during a step of advancing the pocket along the first predetermined path.

7. The method as in claim 1, wherein the first inspection of the commodities of each formed group occupying a respective pocket occurs during a step of advancing the pocket along the first predetermined path.

8. The method as in claim 7, wherein the first inspection occurs at a point occupied by first inspection means located along the first predetermined path.

9. The method as in claim 1, comprising the subsidiary step of allowing groups containing defective commodities to pass through and beyond the first wrapping station without emptying the respective pockets.

10. The method as in claim 1, comprising a step in which the commodities of a group removed from the pocket are ordered in single file on second conveying means and thereupon advanced along the second predetermined path.

11. The method as in claim 10, comprising the step of interposing the commodities between the second conveying means and third conveying means substantially converging with the second conveying means, wherein the second and third conveying means are set in motion by respective drive means at different relative surface speeds.

12. The method as in claim 10, wherein the commodities are fed by the second conveying means to the hopper.

13. The method as in claim 10, wherein use is made of second inspection means located along the second predetermined path and comprising at least one sensor serving to identify the defective commodities advancing on the second conveying means.

14. The method as in claim 13, wherein use is made of a rejection unit positioned along the second predetermined path such as will eliminate the defective commodities identified by the sensor of the second inspection means.

15. The method as in claim 14, wherein the first and second inspection means, the rejection unit and the drive means of the conveying means are interlocked to a master controller.

16. A device for the rejection of commodities supplied en masse to the inlet of a hopper affording at least one outlet and comprising at least one station, coinciding with the outlet, at which the commodities are formed into groups and from where each group of commodities is directed into a respective pocket of first conveying means set in motion along a first predetermined feed path at least toward a first station where the groups of commodities are wrapped, comprising:
first means by which to inspect the commodities of each formed group occupying the respective pocket,
means by which to empty a pocket of a group of commodities in which at least one commodity is identified by the first inspection means as being defective,
means by which to gather the commodities of the group removed thus from the pocket and direct them along a second predetermined path,
second means by which to inspect the single commodities and identify which is or are defective, and
means by which to reject the defective commodity or commodities.

17. The device as in claim 16, wherein the means by which to gather the commodities of the group removed from the pocket comprise second conveying means, set in motion by respective second drive means, on which the commodities are ordered in single file.

18. The device as in claim 17, wherein the means by which to gather the groups of commodities removed from the pocket comprise third conveying means substantially converging with the second conveying means and set in motion by respective third drive means in such a way as to arrange the commodities in single file on the second conveying means.

19. The device as in claim 16, wherein the rejection means comprise at least one blower nozzle capable of eliminating the defective commodity or commodities advancing on the second conveying means.

20. The device as in claim 19, wherein the first inspection means, the second inspection means, the rejection means and the drive means of the conveying means are interlocked to a master controller.

* * * * *